June 6, 1939. M. L. NATTENHEIMER 2,161,632
FASTENING DEVICE
Filed Dec. 20, 1937
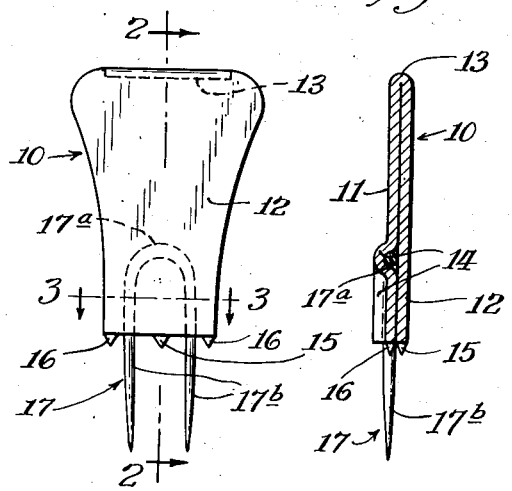
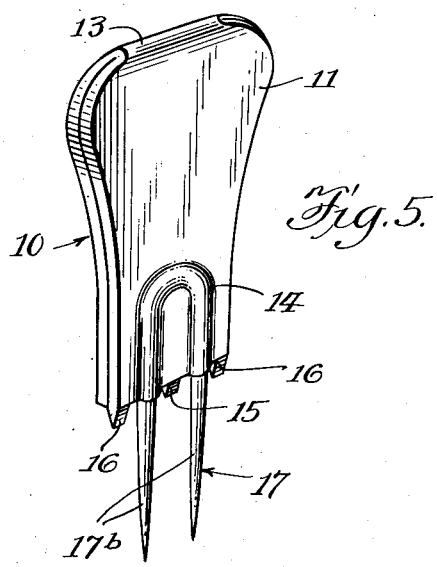
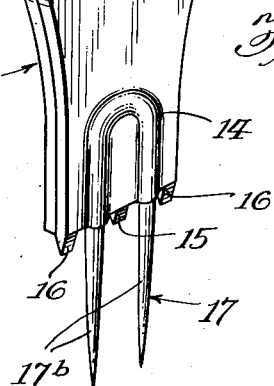
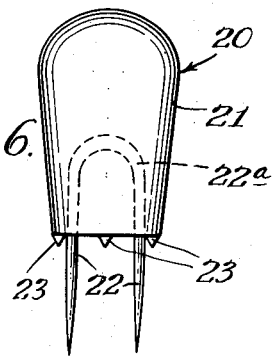
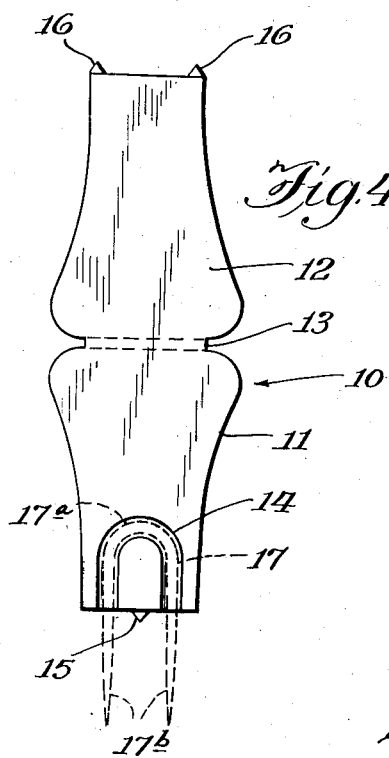
Inventor
Martin L. Nattenheimer
By Max Richard Kraus
Atty Patented June 6, 1939

2,161,632

UNITED STATES PATENT OFFICE 2,161,632

FASTENING DEVICE

Martin L. Nattenheimer, Chicago, Ill.

Application December 20, 1937, Serial No. 180,763

3 Claims. (Cl. 85—49)

This invention relates to a fastening device and more particularly to an improved staple.

One of the objects of my invention is to provide a staple which can be easily applied and readily removed in a minimum of time and with a minimum of effort and which serves to eliminate any tearing of the object to be fastened.

Another object of my invention is to provide a staple which can be repeatedly reused and which is cheap and economical to manufacture.

Other objects will become apparent as this description progresses.

I have found, particularly in the blocking of hats, that when the hat body is placed upon a forming mould that straight pins are inserted to retain the hat body in taut position. However, by the use of such pins, the pins have a tendency to become loosened during the operation on the hat body and further with the use of such pins the fingers or hand of the operator in applying and removing the pin is subjected to pain and further that when the pins are withdrawn they are incapable of being reused. However with my invention I provide a staple which can be very readily grasped to be inserted and which can be very readily removed and which serves to firmly retain the hat body in position on the forming mould. However it will be understood that this invention is applicable as well to other uses wherein pins or other fastening devices are capable of being used.

In the drawing:

Fig. 1 is a side elevational view of one form of my invention;

Fig. 2 is a cross-sectional view taken on the line 2—2 of Fig. 1;

Fig. 3 is a cross-sectional view taken on the line 3—3 of Fig. 1;

Fig. 4 is an elevational view showing the position of the sections of the handle prior to being clamped together to secure the staple in place;

Fig. 5 is a perspective view of the fastening device;

Fig. 6 is an elevational view of a modified form of construction;

Fig. 7 is an end elevation of the modified construction of Fig. 6.

Referring particularly to the Figs. of 1 to 5 inclusive, I provide a metal stamping 10 which forms the handle member for my staple. The stamping is formed of two sections 11 and 12 joined together at 13. The section 11 is stamped to provide a U-shaped recess 14. Formed integrally at the ends of each section is a projection or plurality of projections 15 and 16. As shown in Fig. 4 a U-shaped staple 17 is positioned within the recess 14 and the section 12 is bent over and clamped to assume the position shown in cross-section in Fig. 2 so that the closed end 17a of the staple is imbedded and securely fastened between said sections. With the sections clamped in the position shown, the pin members 17b of the staple project outwardly from the handle and the projecting members 15 and 16 on the ends of the sections likewise project outwardly in the same direction as the pin members. This can best be seen in the perspective view of Fig. 5. With my invention the fastening member can be readily inserted and removed from an object to be stapled or fastened by means of the handle and further that said fastening member can be repeatedly reused. When the fastener is applied to the object to be fastened, the projecting members 15 and 16 grip or rest against the object to additionally secure the object and to more uniformly distribute the strain, so that any tearing of the object which might be caused by the pins 17b is eliminated.

Referring to the modified form of construction shown in Figs. 6 and 7, I provide a single casting 20 shaped to provide a handle 21 in which is imbedded the closed end 22a of the U-shaped staple 22. The end of the handle is provided with projecting points 23.

If desired, in the construction shown in Figs. 1 to 5 inclusive, the recess such as 14 can be eliminated and the staple can be retained between said sections by pressing said sections together so that the closed end of the staple seats within a partial recess formed by the pressure of the stamping against the staple.

Other modifications and changes can be made without departing from the spirit and scope of my invention.

What I desire to secure by Letters Patent is:

1. A fastening device comprising two integrally formed opposed sections provided at their free ends with a plurality of sharp projecting members, said sections adapted to be folded one upon the other, one of said sections having a substantially U shaped recess adapted to receive a similarly shaped staple which is adapted to be secured between the free ends of said sections.

2. A fastening device comprising a handle formed of two sections, one of said sections overlying the other, a U shaped staple received between said sections with the closed end thereof completely enclosed by said sections, and auxiliary fastening means extending outwardly from said sections.

3. A fastening device comprising a handle, a U shaped staple secured to said handle with the closed end of the staple completely encased within said handle so that said handle can be readily grasped, members projecting outwardly from said handle adapted to form auxiliary fastening means.

MARTIN L. NATTENHEIMER.